(12) United States Patent
Castro

(10) Patent No.: US 6,923,561 B2
(45) Date of Patent: Aug. 2, 2005

(54) VEHICLE WHEEL ILLUMINATION DEVICE

(76) Inventor: Albert Castro, 2114 Greenbrier Rd., Long Beach, CA (US) 90815

( * ) Notice: Subject to any disclaimer, the term of this patent is extended or adjusted under 35 U.S.C. 154(b) by 163 days.

(21) Appl. No.: 10/125,854

(22) Filed: Apr. 18, 2002

(65) Prior Publication Data
US 2003/0198059 A1 Oct. 23, 2003

(51) Int. Cl.⁷ ................................................ B60Q 1/00
(52) U.S. Cl. ....................................... 362/500; 362/473
(58) Field of Search ................................. 362/500, 473

(56) References Cited

U.S. PATENT DOCUMENTS

| 1,796,485 A | 3/1931 | Smallwood |
| 4,381,537 A | 4/1983 | Hinrichs ...................... 362/78 |
| 4,430,692 A | 2/1984 | Papadakis .................... 362/32 |
| 4,775,919 A | 10/1988 | Pearsall et al. ............... 362/78 |
| 5,016,144 A | 5/1991 | DiMaggio .................... 362/35 |
| 5,530,630 A | 6/1996 | Williams, Jr. ................ 362/78 |
| 5,548,274 A | 8/1996 | Anderson et al. ............ 340/468 |
| 5,683,164 A | 11/1997 | Chien .......................... 362/78 |
| 5,957,541 A | 9/1999 | Seigler ....................... 301/5.3 |
| 6,045,244 A | 4/2000 | Dixon et al. ................ 362/500 |
| 6,168,301 B1 * | 1/2001 | Martinez et al. ............ 362/500 |
| 6,176,603 B1 | 1/2001 | Spicer ........................ 362/500 |
| 6,322,237 B1 | 11/2001 | Lee ............................. 362/500 |
| 6,601,979 B1 * | 8/2003 | Byrd et al. .................. 362/500 |
| 6,612,726 B1 * | 9/2003 | Gloodt et al. ............... 362/500 |

* cited by examiner

Primary Examiner—Stephen Husar
Assistant Examiner—Anabel Ton
(74) Attorney, Agent, or Firm—Stephen M. Nipper; Dykas, Shaver & Nipper

(57) ABSTRACT

A vehicle wheel illumination device. The illumination device utilizes a source of light, such as automotive light bulbs, to project light onto the inside portion of a wheel's rim. Providing that the wheel's rim has at least one slot or other opening therethrough, the light will emanate out of the wheel's rim, being visible to an individual outside of said vehicle. The device utilizes a frame having a pair of arms, each arm connecting with a bulb and socket. This frame attaching to the frame of the vehicle.

20 Claims, 3 Drawing Sheets

VEHICLE WHEEL ILLUMINATION DEVICE

BACKGROUND OF THE INVENTION

1. Field of the Invention

The present invention generally relates to illuminating devices for automobile wheels, and more particularly relates to illuminating devices for producing an aesthetically pleasing effect through illumination of the inside portion of a wheel or wheel rim whereby light is emitted through the openings within the wheel's rim.

2. Background Information

Many different patents are shown which utilize illuminating devices for vehicle wheels. These devices include illuminating devices which shine lights on the outside surface of the wheel, for instance U.S. Pat. No. 5,548,274 (Anderson et al.). Also included are illumination devices which comprise part of the wheel itself, including lighted hub cap covers, for instance U.S. Pat. No. 4,381,537 (Hinrichs); U.S. Pat. No. 4,430,692 (Papadakis); U.S. Pat. No. 4,775,919 (Pearsall et al.); U.S. Pat. No. 5,016,144 (DiMaggio); U.S. Pat. No. 5,530,630 (Williams, Jr.); U.S. Pat. No. 4,381,537 (Hinrichs); U.S. Pat. No. 5,683,164 (Chien); U.S. Pat. No. 5,957,541 (Seigler); U.S. Pat. No. 6,045,244 (Dixon et al.); U.S. Pat. No. 6,168,301 (Martinez et al.); U.S. Pat. No. 6,176,603 (Spicer); and U.S. Pat. No. 6,322,237 (Lee). Additionally, U.S. Pat. No. 1,796,485 (Smallwood) discloses an automobile lamp for projecting an illumination effect from under the automobile thereby, among other things, illuminating the vehicle's running or foot boards.

However, none of these devices disclose a vehicle wheel illumination device or apparatus which is easy to install, easy to repair, can be produced inexpensively, produces a desired aesthetic illumination affect, illuminates the inside portion of the wheel which can be seen through holes defined within the wheel's rim, and has no moving parts able to be broken. The present invention solves these needs.

SUMMARY OF THE INVENTION

The present invention is an apparatus for lighting a vehicle wheel assembly. Such a vehicle having a frame having at least one rotatably mounted axle. This axle terminating in a pair of axle hubs each able to attach to a wheel. The wheel having a tire mounted on a wheel rim, this wheel rim having an inner and outer side. The wheel is mounted on the axle hub so that the inner side is adjacent to the axle hub and the outer side is remote from the axle hub. In such a manner, an individual standing adjacent to the vehicle would be able to view the outer side of the wheel.

Preferably, the wheel rim will have at least one opening, more preferably a plurality of openings therein, so that light emitted from the present invention can be seen from the outer side of the wheel rim. Additionally, it is preferred that the wheel rim utilized have a reflective finish, such as chrome, etc.

The invented apparatus comprises a source of electrical power on the vehicle for providing electricity to the present invention and a first illumination assembly for illuminating the wheel rim. It is additionally preferred that a second illumination assembly be provided. The first and second illumination assemblies are electrically connected to the electrical power source. The first and second illumination assemblies comprise first and second bulb sockets having bulbs held therein, such as standard twelve volt automotive bulbs.

In the preferred embodiment, the illumination assembly or assemblies attach to a rigid mounting. In the preferred embodiment, the rigid mounting comprises a generally M-shaped length of a stiff wire having a first end extending to a second end. The first illumination means is preferably attached to the first end and the second illumination means is preferably attached to the second end. This rigid mounting is configured for attachment to the frame in a manner whereby the first and second illumination assemblies are located adjacent to the wheel rim's inner side, for instance located above a caliper, thereby allowing the present invention to shine light on the inside surface of the wheel rim, so light shines through the apertures in the wheel rim, thereby allowing an individual outside of the vehicle to see the light emanating therefrom.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
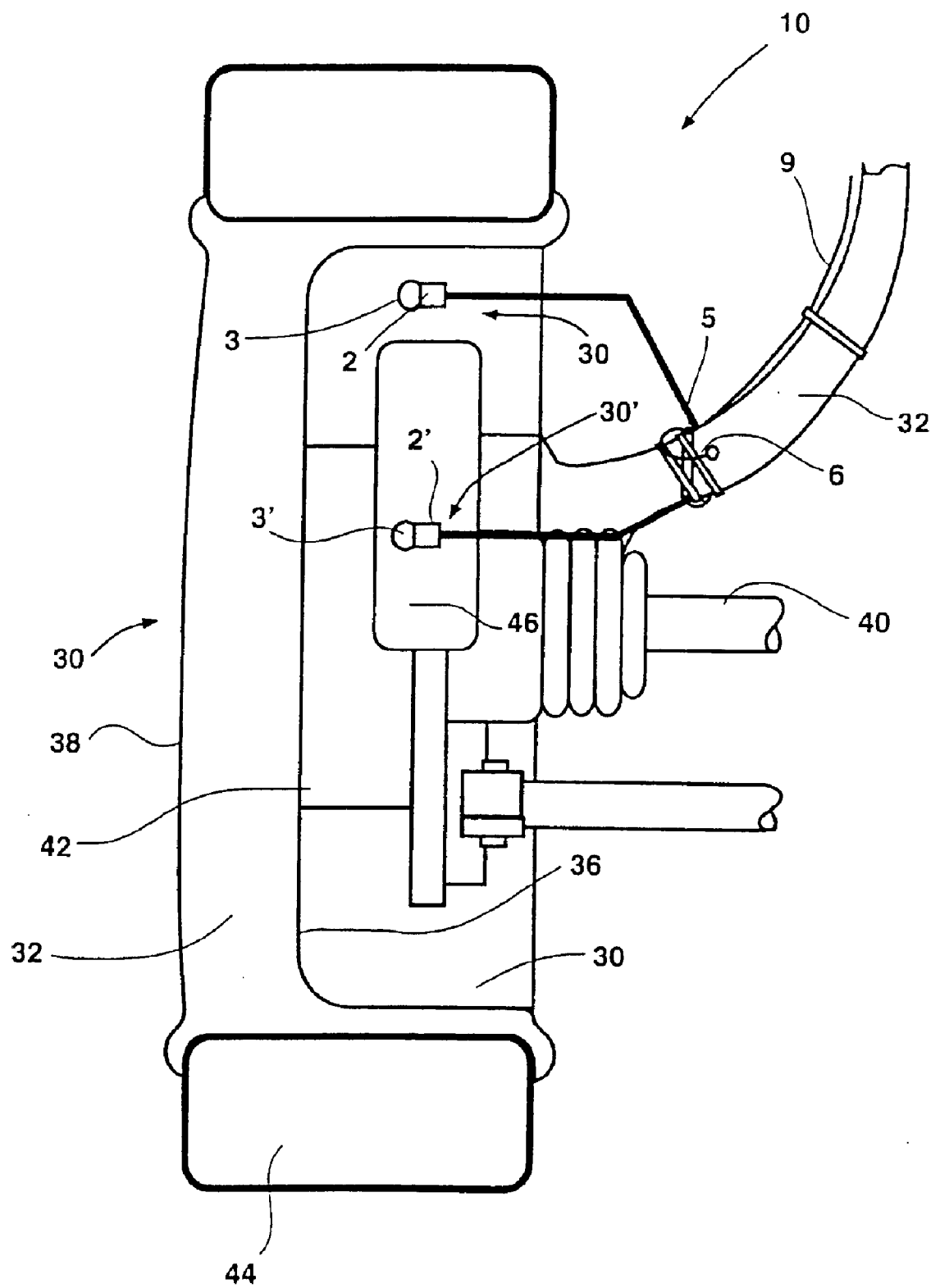
FIG. 1 is an environmental view of one embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is an apparatus for lighting a vehicle wheel assembly. While the present invention has uses as a safety device, more practically, the present invention serves as a vehicle accessory, presenting a desired lighting effect to, through and around a vehicle's wheels. While this disclosure discusses application of the present invention to a solitary wheel of the vehicle, more preferably, one unit of the present invention would be utilized on each wheel of a vehicle.

The present invention works by shining a light from a light source on the inside portion of the wheel rim. When the rim provided has a number of slots, holes or decorative grooves therethrough, this light passes through these groves to be viewed by an individual located adjacent to the vehicle. Preferably, the wheel rim used within such an invention would be covered with a reflective material, such as chrome, thereby increasing the beauty of the display.

The preferred light source comprises an incandescent light bulb. Many different types of bulbs may be utilized with the present invention thereby causing different displays. However, it is preferred that a colored, standard incandescent automotive bulb (12 volt) be utilized for creating a colored lighting effect. Other types of light sources are also envisioned, including but not limited to laser, plasma, fluorescent, halogen, HID, neon, LED, etc.

Referring initially to FIG. 1, one embodiment of the present invention 10 is shown installed upon a vehicle's wheel assembly 30. In this embodiment, the wheel assembly 30 comprises an axle 40 terminating in a hub 42. A wheel having a tire 44 attached to a wheel rim 34 and can attach to the axle 40 at the hub 42. The wheel rim 34 has an inside surface 36 and an outside surface 38. This outside surface 38 being remote from the hub, while the inside surface 36 is adjacent to the hub (as attached). Typically provided on a wheel assembly 30 will also be other standard means, such as the wheel control arm 32, the brake caliper 46, etc.

In this embodiment, the present invention 10 comprises a first illumination assembly 30 and a second illumination assembly 30' attaching to a rigid mounting 5. While this embodiment utilized the preferred pair of illumination assemblies, other embodiments may use more or less. While this is referred to as a "rigid" mounting, non-rigid mounting could also be utilized. The rigid mounting is rigid in the sense that the attached illumination assemblies are able to be generally held in a predetermined position opposite the wheel rim inner side. This mounting 5 is utilized to space apart the illumination assemblies 30, 30' as well as to serve as a point of attachment of the present invention to the vehicle the present invention is utilized upon.

In this embodiment, the rigid mounting 5 is shown attached to the wheel control arm 32 of the vehicle. Other places of attachment are also envisioned, including, but not limited to, the axle 40, the frame, the suspension components, the braking components, and the steering components. Attachment to the attachment point can be through any possible means, including wiring, using plastic ties, zip-ties, etc. The location of attachment of the present invention can be done anywhere so long as the:first and second illumination assemblies 30, 30' shine light upon the inside surface 36 of the wheel rim 34. It is preferred that they be mounted generally adjacent and above the caliper 46, as shown.

Preferably, the mounting is formed of a conductive substance and a ground wire 6 extends between the mounting 5 and the frame of the vehicle, thereby grounding the present invention 10. In less preferred embodiments, a ground wire or other means could be used to ground the illumination assemblies, as necessary.

It is preferred that a positive wire 9 connect between the power source (for instance the vehicle's battery, a battery pack (such as a number of "D-size" batteries), or electrical system connected to said battery) and the light source, for instance the preferred bulb sockets 2, 2'. This can be through use of the wires 18, 18' and butt connector 8 described infra. In the preferred embodiment, the positive wire connects with a 12 volt relay, a wiring harness with a fuse holder, and an on/off switch. The positive wire split into multiple wires, one of which is electrically connected with each bulb socket. Other means of powering the present invention, including battery power, etc., are also envisioned.

Figure 2:
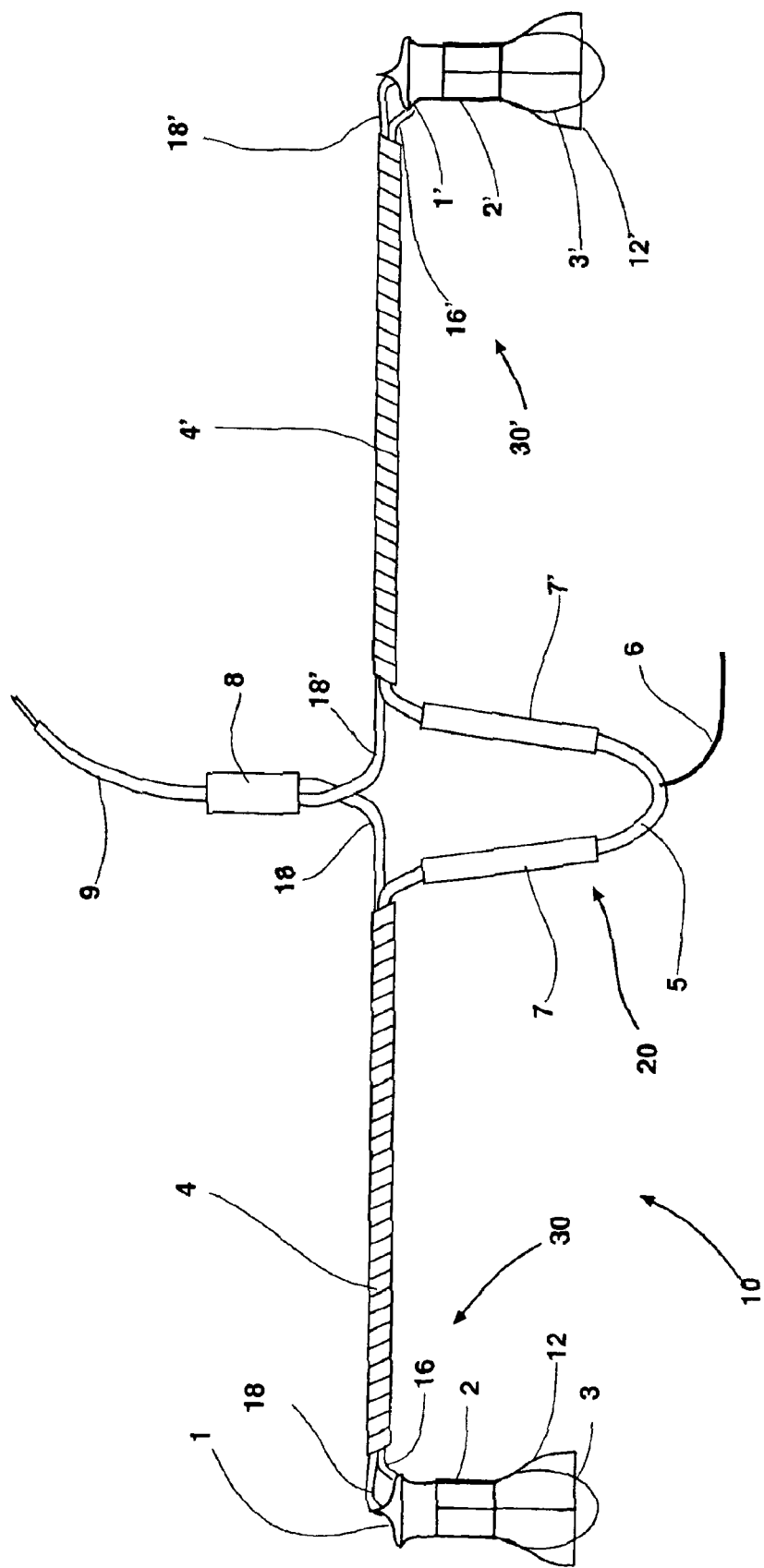
FIG. 2 is a plan view of a second embodiment of the present invention.
Figure 3:
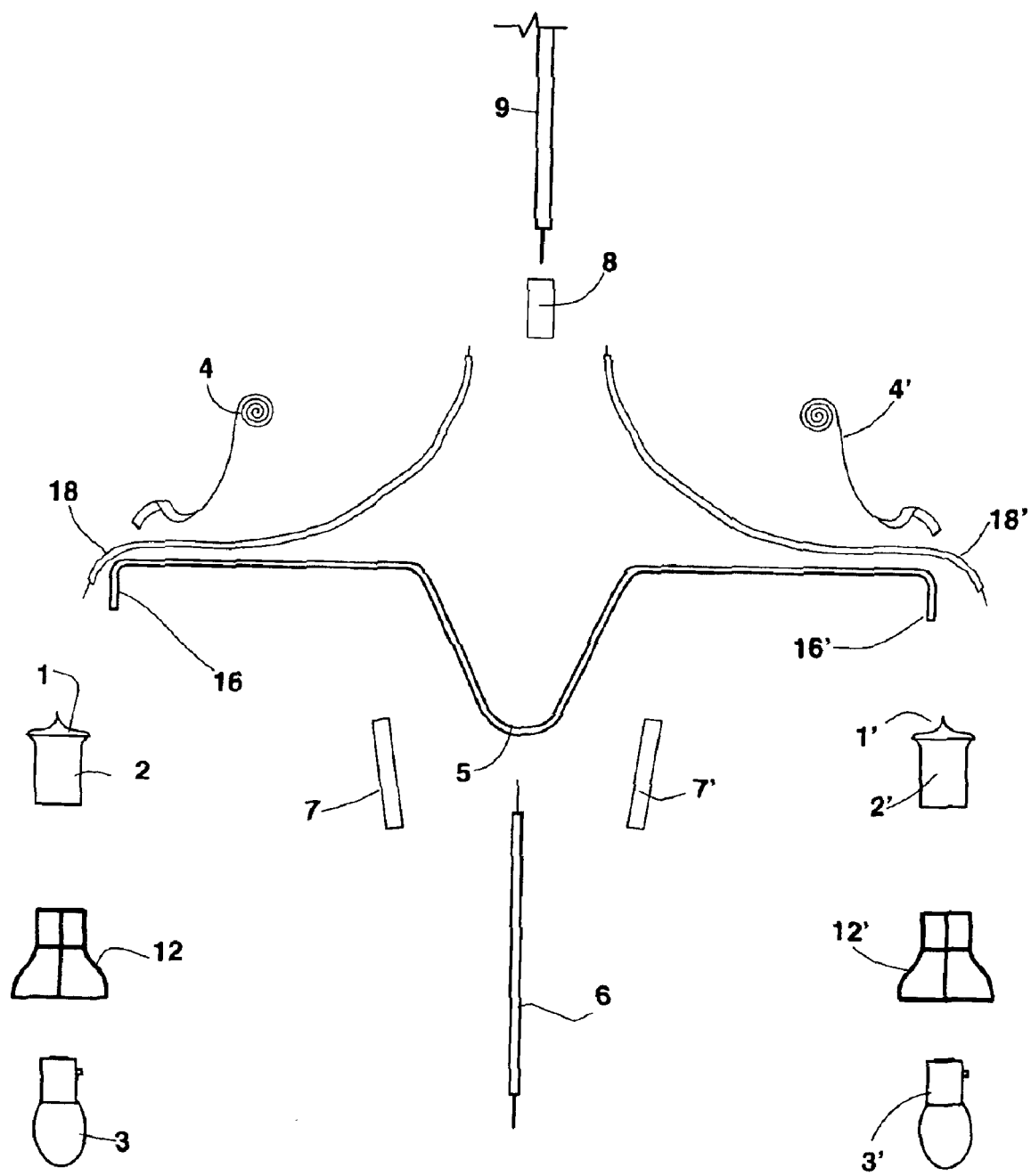
FIG. 3 is an exploded view of the embodiment shown in FIG. 2.

Referring now to FIG. 2, a second embodiment of the present invention is shown. FIG. 3 shows an exploded view of this embodiment. This embodiment of the present invention 10 shows a pair of bulb sockets 2, 2' for each holding a bulb 3, 3'. These bulb sockets being standard automotive bulb sockets. In this embodiment, the sockets have rubber caps 1, 1' and the bulbs have protective guards 12, 12' installed thereon for protecting the bulbs. These caps and guards are preferred, but not required. Rather than rubber caps, shrink tubing can be placed on the bulb sockets for weather proofing.

In this embodiment the (preferred) sockets are made from metal, thereby allowing the metal first and second ends (16, 16') of the mounting 5 to be soldered or otherwise affixed to the sockets. The preferred mounting 5 comprises a length of solid copper wire (6 gauge) which is bent into a generally M-shape, defining the first and second ends as well as the mounting portion 20 configured for attachment to the portion of the vehicle to which the user wishes to mount the present invention. This mounting portion can be part of the mounting itself, or can be an additional structure attaching thereto. By having the mounting portion extend away from the general portion of the mounting, a flange is formed which would allow a user to easily attach the mounting to the vehicle at a preferred location.

Connecting to the bulb sockets are electrical connections, preferably the positive wires 18, 18' shown. These positive wires 18, 18' being joined at a butt connector 8 which connects with the positive wire 9, which ultimately is connected to the power source either directly or indirectly. These wires 18, 18' are preferably 16 to 22 AWG. It is preferred that wire loom 4, 4' or other protective covering be utilize to attach the wires 18, 18' to the mounting 5.

The mounting 5 is preferably provided with at least one handle grip 7, 7' for allowing for easier handling of the present invention and for allowing the present invention to be more securely attached to its attachment point, such as the axle. In this embodiment, the grips 7, 7' are part of the mounting portion 20.

Preferably extending from the rigid mounting 5 is a ground wire 6 for grounding attachment to the frame of the vehicle. In this manner, the bulb socket merely needs to connect with the positive wire, and the exterior portion of the bulb socket soldered to the metal rigid mounting serves to ground the bulb socket. This ground wire can be of whatever gauge is necessary, for instance 16 to 22 AWG wire.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. An apparatus for lighting a vehicle wheel assembly, said vehicle having a stationary frame having at least one rotatably mounted axle, said axle terminating in an axle hub able to attach to a wheel, said wheel comprising a wheel rim having inner and outer sides mounted on said axle hub such that the inner side is adjacent said hub and said outer side is remote from said hub, said apparatus comprising:
   a source of electrical power on said vehicle;
   at least one illumination assembly for illuminating said wheel rim, said illumination assembly electrically connected to said electrical power source; and
   a mounting for fixedly connecting with said illumination assembly, said mounting for mounting said illumination assembly at a mounting location on said vehicle, said mounting location adjacent said inner side of said wheel rim, said mounting not attaching to said wheel, said mounting not extending through said wheel;

wherein said wheel rim has at least one opening therein so that light from said apparatus can be seen from said outer side of said wheel rim.

2. The apparatus of claim 1, wherein said mounting comprises a length of generally M-shaped wire.

3. The apparatus of claim 1, wherein said frame further comprises a wheel control arm, wherein said mounting location is on said control arm.

4. The apparatus of claim 1, wherein mounting has a first end extending to a second end, wherein said illumination assembly comprises a first bulb socket and a second bulb socket, wherein said first bulb socket is mounted on said first end and said second bulb socket is mounted on said second end, each of said bulb sockets for connection with a light bulb.

5. The apparatus of claim 4, wherein said mounting comprises a length of generally M-shaped wire, and wherein said first and second bulb sockets are soldered to said mounting.

6. The apparatus of claim 4, wherein each light bulb is a 12-volt automotive bulb.

7. An apparatus for lighting a vehicle wheel assembly, said vehicle having a stationary frame having at least one rotatably mounted axle, said axle terminating in an axle hub able to attach to a wheel, said wheel comprising a wheel rim having inner and outer sides, said wheel mounted on said axle hub such that the inner side is adjacent said hub and said outer side is remote from said hub, said apparatus comprising:

a source of electrical power on said vehicle;

a first illumination assembly for illuminating said wheel rim, said first illumination assembly electrically connected to said electrical power source, said first illumination assembly comprising a first socket;

a second illumination assembly for illuminating said wheel rim, said second illumination assembly electrically connected to said electrical power source, said second illumination assembly comprising a second socket; and a rigid mounting for fixedly connecting with said first illumination assembly and with said second illumination assembly, said rigid mounting is elongated, having a first end extending to a second end, wherein said first socket attaches to said first end and said second socket attaches to said second end, said rigid mounting configured for attachment to said frame in a manner whereby said first and second illumination assemblies are adjacent said wheel rim inner side;

wherein said wheel rim has at least one opening therein so that light from said apparatus can be seen from said outer side of said wheel rim.

8. The apparatus of claim 7, wherein said rigid mounting comprises a generally M-shaped length of stiff wire.

9. The apparatus of claim 7, wherein said frame further comprises at least one control arm and wherein said rigid mounting attaches to said frame at said control arm.

10. The apparatus of claim 7, wherein said rigid mounting attaches to said frame at said axle.

11. The apparatus of claim 7, wherein said rigid mounting is attached to said frame through use of at least one length of wire connecting said rigid mounting to said frame.

12. The apparatus of claim 7, wherein said rigid mounting is attached to said frame through use of at least one plastic tie connecting said rigid mounting to said frame.

13. The apparatus of claim 7, wherein said first illumination assembly comprises a 12-volt bulb mounted in said first socket.

14. The apparatus of claim 7, wherein said second illumination assembly comprises a 12-volt bulb mounted in said second socket.

15. The apparatus of claim 7, wherein said rigid mounting is provided with at least one rubber grip thereon for allowing a user to more conveniently grip said rigid mounting.

16. The apparatus of claim 7, wherein said first illumination assembly comprises a first 12-volt bulb mounted in said first socket, and wherein said second illumination assembly comprises a second 12-volt bulb mounted in said second socket.

17. The apparatus of claim 16, wherein said sockets further comprise bulb guards for protecting said bulbs from damage.

18. The apparatus of claim 16, wherein said rigid mounting is a generally M-shaped length of wire and wherein sockets are soldered to said ends.

19. The apparatus of claim 18, wherein a ground wire connects said rigid mounting to said frame thereby grounding said rigid mounting and attached sockets.

20. An apparatus for lighting a vehicle wheel assembly, said vehicle having a stationary frame having at least one rotatably mounted axle, said axle terminating in an axle hub able to attach to a wheel, said wheel comprising a wheel rim having inner and outer sides, said wheel mounted on said axle hub such that the inner side is adjacent said hub and said outer side is remote from said hub, said wheel rim having at least one opening therein so that light from said apparatus can be seen from said outer side of said wheel rim; said apparatus comprising:

a source of electrical power on said frame;

a first illumination assembly for illuminating said wheel rim, said first illumination assembly electrically connected to said electrical power source, said first illumination assembly comprising a first socket and a 12-volt bulb;

a second illumination assembly for illuminating said wheel rim, said second illumination assembly electrically connected to said electrical power source, said second illumination assembly comprising a second socket and a 12-volt bulb; and a rigid mounting for fixedly connecting with said first illumination assembly and with said second illumination assembly, said rigid mounting comprising a generally M-shaped length of stiff wire having a first end extending to a second end, wherein said first socket is soldered to said first end and said second socket is soldered to said second end, said rigid mounting configured for attachment to said frame in a manner whereby said first and second illumination assemblies are adjacent said wheel rim inner side.

* * * * *